United States Patent [19]
Mullenberg

[11] Patent Number: 5,775,831
[45] Date of Patent: Jul. 7, 1998

[54] CONNECTED COMPONENT ASSEMBLY HAVING CONICAL CLAMPING SLEVES

[76] Inventor: Ralph Mullenberg, Im Wiesengrund 6, D-41516 Grevenbroich, Germany

[21] Appl. No.: 696,931
[22] PCT Filed: Feb. 15, 1995
[86] PCT No.: PCT/DE95/00190
§ 371 Date: Aug. 21, 1996
§ 102(e) Date: Aug. 21, 1996
[87] PCT Pub. No.: WO95/23926
PCT Pub. Date: Sep. 8, 1995

[30] Foreign Application Priority Data

Mar. 2, 1994 [DE] Germany ............... 9403481 U

[51] Int. Cl.$^6$ ............................................. F16B 2/14
[52] U.S. Cl. ...................... 403/337; 403/370; 403/258
[58] Field of Search ........................ 403/370, 367, 403/368, 373, 374, 371, 409.1, 337, 335, 23, 260, 258, 256

[56] References Cited

U.S. PATENT DOCUMENTS

| | | | |
|---|---|---|---|
| 2,433,617 | 12/1947 | Marsilius | 403/374 |
| 2,755,093 | 7/1956 | Peter et al. | 279/2 |
| 3,776,651 | 12/1973 | Peter et al. | 403/370 X |
| 3,841,771 | 10/1974 | Shankwitz et al. | 403/371 X |
| 3,972,636 | 8/1976 | Peter et al. | 403/370 X |
| 4,022,536 | 5/1977 | Piepho et al. | 403/371 X |
| 4,089,613 | 5/1978 | Babbitt, Jr. | 403/370 X |
| 4,268,185 | 5/1981 | Mullenberg | 403/370 X |
| 4,279,530 | 7/1981 | Mullenberg | 403/337 |
| 4,304,502 | 12/1981 | Stratienko | 403/370 |
| 5,174,680 | 12/1992 | Nakamura et al. | 403/370 |
| 5,176,464 | 1/1993 | Tanner | 403/370 |
| 5,263,802 | 11/1993 | Fichot et al. | 403/370 X |
| 5,269,622 | 12/1993 | Mullenberg | 403/370 |
| 5,558,457 | 9/1996 | Mullenberg | 403/370 |

FOREIGN PATENT DOCUMENTS

| | | | |
|---|---|---|---|
| 0153487 | 9/1985 | European Pat. Off. | |
| 1750905 | 12/1970 | Germany. | |
| 3536920 | 9/1986 | Germany. | |
| 1656220 | 6/1991 | U.S.S.R. | 403/370 |

*Primary Examiner*—Harry C. Kim
*Attorney, Agent, or Firm*—Vickers, Daniels & Young

[57] ABSTRACT

The component assembly (100) serves in a free from play connection of two components (1, 2) by a radially-expandable, conical clamping system (10) arranged in aligned bores (5, 6) of the first component (1) and the second component (2). The clamping arrangement (100) is intended to be clamped and released if inserted into a blind bore (5) of the first component (1). For this purpose, the outer sleeve (14) of the conical clamping system (10) has at one end a radial circumferential projection (17) that rests axially against the outside of the second component (2), while the other end of the outer sleeve (14) is cylindrical throughout and has a diameter that corresponds to the diameter of the bore configured as a blind bore (5) in the first component (1), and a coaxial threaded bore (7) is provided in the bottom (8) of the bore (5), the threaded bore having a smaller diameter than a through bore (12) that is present as a through bore (12) in the conical clamping system (10) and receives the clamping bolt (22).

15 Claims, 1 Drawing Sheet

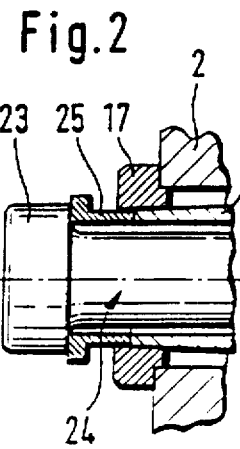
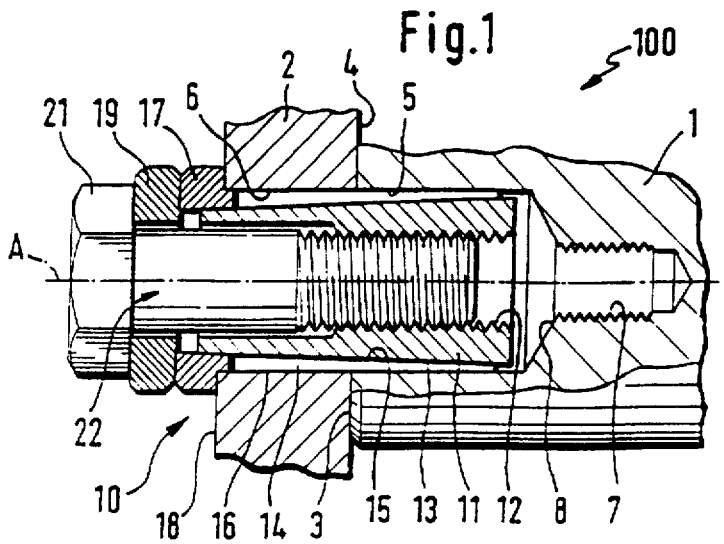
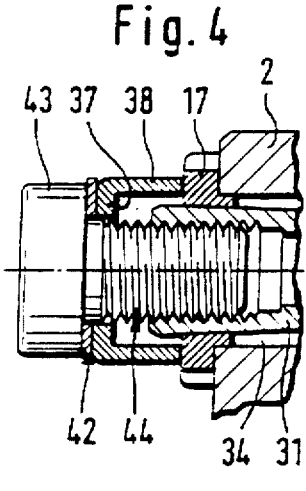
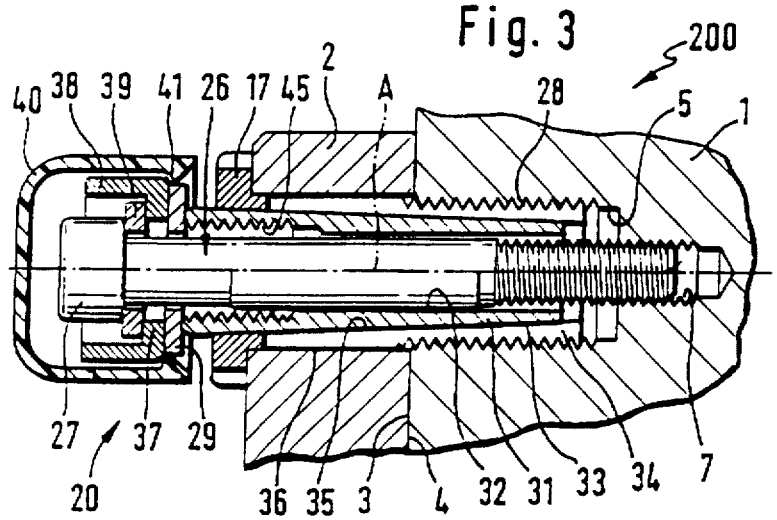
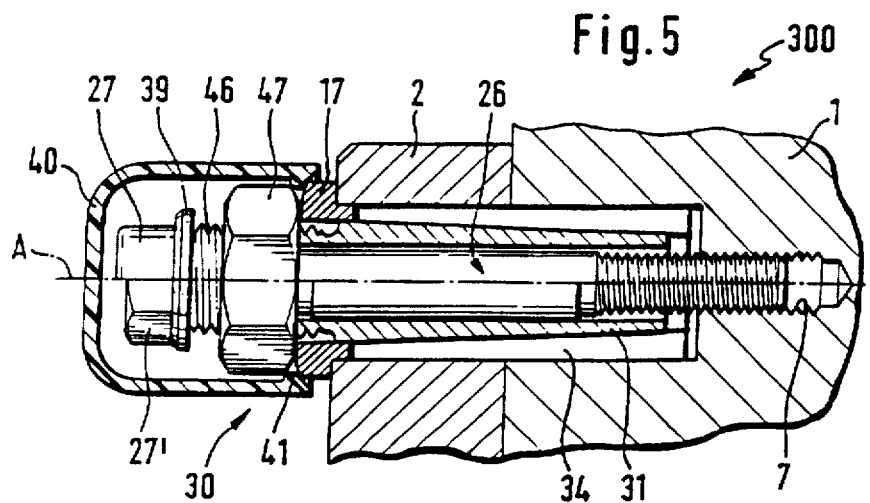

CONNECTED COMPONENT ASSEMBLY HAVING CONICAL CLAMPING SLEVES

BACKGROUND OF THE INVENTION

The invention relates to a component assembly for a connection of two components by a conical clamping system which reduces play between individual components.

A generic example of the state of the art in the form of a flanged connection is known from Mulllenberg U.S. Pat. No. 4,279,530. In a flanged connection, access to the conical clamping sleeves that produce the connection is easily possible from the two ends of the sleeves. Consequently, means for releasing the known conical clamping sleeve, which are necessary when the conical clamping sleeve has self-locking angled members, can also be used easily. It is only disclosed that such additional means are necessary for release; no further details are given about them. A connected component assembly having a conical clamping pin is also known from DE 1,750,905 having a conical clamping pin that extends into a blind bore of one component, the bottom of which contains a thread. However, no separate clamping screw is present through which a through hole of the inner pin part extends; rather the actual inner pin part, which extends into the threaded bore, must be rotated. The clamping can no longer be released with self-locking conical angled numbers.

SUMMARY OF THE INVENTION

It is the object of the invention to configure a component assembly of this type such that it can be clamped and released when it must be inserted into a blind bore of the first component, that is, when access to the conical clamping sleeve from the end located opposite the clamping side is not possible.

This object is accomplished by a component assembly which reduces play between the individual components of the assembly by a conical clamping system.

The circumferential projection on the outer sleeve and the threaded bore in the bottom of the blind bore interact during clamping or releasing in order to provide axial support for the sleeve parts or to act on them. In both processes, therefore, a controlled force to effect release or clamping is possible.

In a preffered embodiment, no external forces are needed, that is, the threaded bore in the bottom of the blind bore is not necessary during clamping. During release, however, the release bolt is screwed into this threaded bore and presses the inner sleeve part into the blind bore, while the outer sleeve part is held securely by the circumferential projection. The sleeve parts are thus separated from one another.

So that the inner sleeve part need not project axially beyond the circumferential projection, it is advisable to provide an auxiliary ring by means of which the force of the release bolt can be transmitted into the interior of the outer sleeve part.

In another instance, the situation is reversed: during clamping, the clamping bolt is screwed into the threaded bore in the bottom of the blind bore, while the parts are separated by the bolt arrangement during release without necessitating external forces.

In a first variation, the bolt arrangement can be configured wherein the bolt arrangement includes an inner thread and a releasing bolt that extends into it. Further, the bolt arrangement may utilize an auxiliary ring. Another variation is wherein the inner sleeve continues axially outside of the circumferential projection of the outer sleeve, and the bolt arrangement includes an outer thread attached at that point and having a nut supported axially from the outside against the circumferential projection.

Another embodiment permits the two components to be pulled toward one another in the axial direction by means of screwing in the outer sleeve part. After axial clamping has been effected, the conical clamping sleeve is actuated, which makes the connection free of radial play, and the components are held securely against one another in this direction without play.

It is advisable to provide a protective cap in order to protect against corrosion.

BRIEF DESCRIPTION OF THE DRAWINGS

The drawings illustrate embodiments of the invention in longitudinal sections through the axes.

FIG. 1 shows a first embodiment of the clamping arrangement during clamping;

FIG. 2 shows the left part of FIG. 1 during release;

FIGS. 3 and 4 show corresponding views of another embodiment; and

FIG. 5 shows a view of a further embodiment corresponding to FIG. 3.

PREFERRED EMBODIMENTS COMPONENT ASSEMBLY

The 100 illustrated in FIGS. 1 and 2 shows the connection of a first component 1 with a second component 2 with the aid of a conical clamping system 10. In this embodiment, the first component 1 is a shaft having a planar end face 3 that extends perpendicularly to the axis, and against which the planar, right limiting face 4 of the component 2 rests. The faces 3, 4 do not need to be planar, however, and also need not rest against one another. A small distance can be left between them, provided that a sufficient clamping length of the conical clamping system 10 remains. The component 2 can be, for example, a flange or similar plate to be secured in front of the end face 3 of the shaft 1.

The conical clamping system 10 has an axis A and extends into a blind bore 5 of the component 1, passing through a through bore 6 in the component 2. The bores 5, 6 have identical diameters. A threaded bore 7 that extends coaxially to the axis A is provided in the bottom 8 of the blind bore 5.

The conical clamping system 10 includes an inner conical part 11 having a threaded bore 12, which is coaxial to the axis A, and a conical circumferential surface 13 having a conical angle in the self-locking range, for example 1:12, and which is reduced in diameter from right to left in FIG. 1.

The inner sleeve 11 is surrounded by a bushing-like, outer sleeve 14, which has an inner conical surface 15 that extends at the same conical angle as the conical surface 13, and with which the outer sleeve part rests against the conical surface 13. The outer circumferential surface 16 is cylindrical and has a diameter that permits the conical clamping system 10 to fit readily into the bores 5, 6 in the unclamped state.

The outer sleeve 14 has a radial circumferential projection 17 at its end shown on the left in FIG. 1. In the embodiment, the projection is configured as a through circumferential collar that is closed over the circumference. The circumferential collar rests with its right end face against the outer limiting face 18 of the second component 2, the limiting face being on the left with respect to the blind bore 5 in FIG. 1.

The head 21 of a clamping bolt indicated in its entirety by 22 is supported, via an intermediate ring 19, against the outer end face of the circumferential projection 17; the threaded part of this bolt extends into the threaded bore 12 of the inner sleeve 11.

The circumferential projection 17 can have a keyed surface at its outer circumference, so that a lockup can be effected when the clamping bolt 22 is tightened. During this tightening, the inner sleeve 11 is pulled from right to left into the outer sleeve 14, and the conical faces 13, 15 slide toward one another. The outer conical part 14 expands radially, and is clamped without play in the bores 5, 6. To facilitate the expansion without losing much of the clamping force of the clamping bolt 22 due to deformation of the outer sleeve 14, the outer sleeve 14 can be slit longitudinally almost to the circumferential projection 17, as indicated by the missing cross-hatching.

When the clamping bolt 22 is tightened, the axial forces remain entirely inside the conical clamping system 10. The circumferential projection 17 merely functions as a stop when the conical clamping system 10 is pushed in.

In order to release the component assembly 100, the clamping bolt 22 is unscrewed. The sleeve parts 11, 14 remain clamped because of the self-locking angled member. A release bolt 24, having a correspondingly smaller diameter, is now guided through the threaded bore 12, and its end is screwed into the threaded bore 7 on the bottom of the blind bore 5. An auxiliary ring 25 that transmits the releasing forces is provided between the head 23 of the release bolt 24 and the end face of the inner sleeve 11 shown on the left in FIGS. 1 and 2. By means of this ring, the inner sleeve 11, according to FIGS. 1 and 2, is displaced to the right, that is, into the blind bore 5 when the release bolt 24 is tightened. Of course, the lengths are dimensioned such that sufficient space for the displacement remains on the right side of the inner sleeve 11 in FIG. 1.

During release, the inner sleeve 11 is pulled to the right and the outer sleeve 14 is held securely by the circumferential projection 17. Therefore, in the event of release, the function of circumferential projection 17 in the clamping arrangement 100 is to transmit the releasing forces.

The same reference numerals are used for corresponding parts in the further component assembly.

In the component assembly 200, the conical clamping system 20 encompasses an inner sleeve 31 having a through bore 32 that extends coaxially to the axis A. The conical, outer circumferential face 33 having a conical angle member within the self-locking range interacts with the conical, inner circumferential face 35 of a bushing-like, outer sleeve 34 having an essentially cylindrical outer circumference 36 that fits into the through bore 6 of the component 2, and an outer thread 28 in the region that extends into the component 1 and engages a corresponding inner thread in the blind bore 5.

At the left end in FIGS. 3 and 4, the outer sleeve 34 again has a circumferential projection 17 that corresponds in function to the circumferential projection 17 in FIGS. 1 and 2 and is configured at the outer circumference for the engagement of a spanner wrench.

In the embodiment according to FIGS. 3 and 4, the inner sleeve 31 projects, axially and to the left, slightly beyond the circumferential projection 17. An intermediate ring 29 against which the end face of the inner collar 37 of the auxiliary ring 38 rests is provided in front of the end-face end of the inner sleeve 31. A flat washer 39 that is supported against the head 27 of the clamping bolt 26 acts against the opposite-positioned limit of the inner collar 37. When tightening the clamping bolt 26, the inner sleeve 31 is pushed to the right into the outer sleeve 34 by parts 39, 37, 29; the circumferential projection 17 holds the outer sleeve 34 securely against the face of the component 2 on the left in FIG. 3.

In this embodiment, the circumferential projection 17 constitutes the abutment against the axial forces of the clamping bolt 26 during clamping.

To release the component assembly 200, the clamping bolt 26 is rotated out and, in its place, a release bolt 44 that has a larger diameter than the clamping bolt 26 is screwed into an inner thread 45 of the inner sleeve 31. The thread exceeds the through bore 32 in diameter, and the end of the inner sleeve part at which the diameter of the conical circumferential face 33 is larger is attached thereto. The auxiliary ring 38 is rotated with respect to the clamping position, in which it is only held ready but performs no actual function, and is brought into the position seen in FIG. 4. By way of a flat washer 42, the head 43 of the release bolt 44 acts against the end of the auxiliary ring 38 at which the inner collar 37 is configured. According to FIG. 4, the inner conical part 31 is pulled to the left out of the outer conical part 34, and thus released, when the release bolt 44 is tightened.

To protect the parts of the conical clamping system 20 projecting to the left beyond the circumferential projection 17 according to FIG. 3, a pot-shaped cap 40 made of suitable plastic is provided; this cap extends with an inner circumferential rib 41 behind the right, outer circumferential edge of the auxiliary ring 38 projecting slightly radially beyond the flat washer 29.

The function of the component assembly 300 of FIG. 5 is identical to that of the component assembly 200, the difference being that the inner sleeve 31 has at its outer circumference, axially outside of the circumferential projection 17, an outer thread 46 onto which a nut 47 can be screwed that rests directly against the limiting face of the circumferential projection 17 on the left in FIG. 5, and which, according to FIG. 5, pulls the inner sleeve 31 to the left out of the outer sleeve 34 during tightening. During release, the forces remain entirely inside the conical clamping system 30. The circumferential projection 17 and the threaded bore 7 only interact during clamping of the component assembly 300.

In this embodiment, the inner circumferential rib 41 of the pot-shaped cap 40 extends behind the right edge of the nut 47.

In FIG. 5, it is indicated that a bolt, the head of which is 27' and hexagonal on the outside can be used instead of a head 27 that is hexagonal on the inside.

Having thus described the invention, it is claimed:

1. A component assembly for clamping a first component and an axially adjacent second component by a conical clamping system arranged in axially aligned bores of the first component and the second component, the assembly including an inner sleeve part that has a central bore and a conical outer circumferential surface extending concentrically thereto and having a first conical angle in a self-locking range, the assembly further including a bushing-like, outer sleeve part that has a cylindrical outer circumferential surface and a conical inner circumferential surface having a second conical angle generally the same as said first conical angle, the inner circumferential surface being matched to interact with the conical outer circumferential surface of the inner sleeve part, the assembly further comprising a clamping bolt that engages said central bore from an end of the conical clamping system, the bolt having a head for supporting itself against an adjacent end of one of said inner sleeve part or said outer sleeve part which allows said sleeve parts to be displaced toward one another sliding axially over the conical surfaces as the outer sleeve part expands radially, wherein at one end, the outer sleeve part supports a radial circumferential projection that rests axially against the outside of the second component, while the other end of the outer sleeve part is cylindrical throughout and has a diameter that corresponds to the diameter of the bore configured as a blind bore in the first component, and a coaxial threaded bore of a smaller diameter is provided in the bottom of the blind bore.

2. A component assembly as defined in claim 1, wherein the circumferential projection is arranged at the end of the outer sleeve part at which the diameter of the conical inner circumferential surface is smaller, and, for clamping, the clamping bolt rests against the circumferential projection axially from the outside, for releasing, a release bolt is provided that has a head and is smaller in diameter than the clamping bolt, and the threaded bore in the bottom of the blind bore is matched to the release bolt, and that the release bolt is supported axially from the outside against the end face of the inner sleeve part.

3. A component assembly as defined in claim 2, wherein an auxiliary ring is provided which extends into an end of the bushing-like, outer sleeve part at which the diameter of the conical inner circumferential face is smaller, and lies in front of the end surface of the inner sleeve part, and against which the release bolt rests with its head, axially from the outside.

4. A component assembly as defined in claim 1, wherein at the end at which the diameter of the conical inner circumferential surface is larger, the outer sleeve part supports said radial circumferential projection that rests axially against the outside of the second component, for clamping, the clamping bolt extends through the inner sleeve part in said central bore, and the threaded bore in the bottom of the blind bore is matched to the clamping bolt, and the clamping bolt is supported with its head against the end face of the inner sleeve part, and that, for release, a bolt arrangement is provided that encompasses a thread on the inner conical part and a bolt part that is supported axially from the outside against the circumferential projection.

5. A component assembly as defined in claim 4, wherein the bolt arrangement includes an inner thread and a releasing bolt that extends into it.

6. A component assembly as defined in claim 5, wherein said clamping bolt includes a head portion and a shaft portion, an auxiliary ring having an inner collar at one end is provided, with the annular diameter being just larger than the outer diameter of the inner sleeve parts at its outer end, and the inner collar diameter being just larger than the diameter of the shaft portion of the clamping bolt.

7. A component assembly as defined in claim 6, wherein an extension portion of the inner sleeve part extends axially outside of the circumferential projection of the outer sleeve part, and the bolt arrangement includes an outer thread attached at said extension portion and having a nut supported axially from the outside against the circumferential projection.

8. A component assembly as defined in claim 5, wherein an extension portion of the inner sleeve part extends axially outside of the circumferential projection of the outer sleeve part, and the bolt arrangement includes an outer thread attached at said extension portion and having a nut supported axially from the outside against the circumferential projection.

9. A component assembly as defined in claim 8, wherein the outer sleeve part has at its outer circumference an outer thread that engages an inner thread in the blind bore of the first component.

10. A component assembly as defined in claim 1, wherein the outer sleeve part has at its outer circumference an outer thread that engages an inner thread in the blind bore of the first component.

11. A component assembly as defined in claim 10, wherein a pot-shaped protective cap is provided that tightly covers the parts of conical clamping systems said camp projecting axially from the circumferential projection and an edge of said cap secured to the conical clamping system by a snap connection.

12. A component assembly as defined in claim 1, wherein a pot-shaped protective cap is provided that tightly covers the parts of conical clamping system, said cap projecting axially from the circumferential projection and an edge of said cap secured to the conical clamping system by a snap connection.

13. A component assembly as defined in claim 1, wherein at an end at which the diameter of the conical inner circumferential surface is larger, the outer sleeve part supports the radial circumferential projection that rests axially against the outside of the second component, the clamping bolt extends through the inner sleeve part in said central bore, and the threaded bore in the bottom of the blind bore is matched to the clamping bolt.

14. A component assembly as defined in claim 13, wherein the inner sleeve part extends axially outside of the circumferential projection of the outer sleeve part, and a bolt arrangement is provided for release, said bolt arrangement including an outer thread and a nut supported axially on the outer thread and against the circumferential projection.

15. A component assembly as defined in claim 1, wherein the inner sleeve part extends axially outside of the circumferential projection of the outer sleeve part, and a bolt arrangement is provided for release said bolt arrangement including an outer thread and a nut supported axially on the outer thread and against the circumferential projection.

* * * * *